US 6,644,815 B2

(12) United States Patent
Lee

(10) Patent No.: US 6,644,815 B2
(45) Date of Patent: Nov. 11, 2003

(54) TOTAL REFLECTION PRISM AND PROJECTOR WITH THE SAME

(75) Inventor: Seung Gyu Lee, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/026,526

(22) Filed: Dec. 27, 2001

(65) Prior Publication Data

US 2002/0118343 A1 Aug. 29, 2002

(30) Foreign Application Priority Data

Dec. 29, 2000 (KR) .................................... 2000-0085798

(51) Int. Cl.[7] .................. G03B 21/14; G03B 21/28; G03B 21/26; G03B 21/00; G02B 5/22
(52) U.S. Cl. ................ 353/84; 353/30; 353/31; 353/33; 353/81; 359/885; 359/887
(58) Field of Search ................ 353/20, 84, 31, 353/33, 34, 37, 102, 30, 29, 81; 359/885, 887

(56) References Cited

U.S. PATENT DOCUMENTS

| 4,969,730 A | | 11/1990 | van den Brandt | 353/31 |
|---|---|---|---|---|
| 5,309,188 A | | 5/1994 | Burstyn | 353/33 |
| 5,386,250 A | | 1/1995 | Guerinot | 348/770 |
| 5,420,655 A | | 5/1995 | Shimizu | 353/33 |
| 5,552,922 A | | 9/1996 | Magarill | 359/224 |
| 6,005,722 A | * | 12/1999 | Butterworth et al. | 359/712 |
| 6,266,105 B1 | * | 7/2001 | Gleckman | 348/743 |
| 6,443,576 B1 | * | 9/2002 | Nishida et al. | 353/98 |
| 6,491,398 B2 | * | 12/2002 | Takeuchi et al. | 353/31 |
| 6,505,939 B1 | * | 1/2003 | Bierhuizen et al. | 353/94 |
| 2002/0021505 A1 | * | 2/2002 | Lee | 359/834 |
| 2002/0140910 A1 | * | 10/2002 | Stark et al. | 353/84 |
| 2002/0176055 A1 | * | 11/2002 | De Vaan et al. | 353/31 |
| 2002/0180934 A1 | * | 12/2002 | Shimizu | 353/30 |

FOREIGN PATENT DOCUMENTS

EP 1033614 A2 6/2000 ............ G03B/21/14

\* cited by examiner

*Primary Examiner*—Russell Adams
*Assistant Examiner*—Melissa J Koval
(74) *Attorney, Agent, or Firm*—Fleshner & Kim, LLP

(57) ABSTRACT

A projection system is provided that utilizes a prism which guides color components from a light source to a display without the use of reflection, and that reflects image encoded light from the display toward a projection lens, thereby minimizing loss of luminance and improving contrast. In one embodiment, the projection system utilizes a color drum for sequentially transmitting color components of a light source towards the prism.

6 Claims, 14 Drawing Sheets

TOTAL REFLECTION PRISM AND PROJECTOR WITH THE SAME

This application claims the benefit of the Korean Application No. P2000-85798 filed on Dec. 29, 2000, which is hereby incorporated by reference.

BACKGROUND OF THE INVENTION

1. Field of the Invention

The present invention relates to a total reflection prism and a projector with the same.

2. Background of the Related Art

The projector enlarges, and projects a small picture by using a projection lens to a large sized screen, to display a large sized picture. The projector is provided with a color wheel for splitting a red color 'R', a green color 'G', and a blue color 'B' on time basis for reproducing colors. The color wheel is rotated by motor for splitting the colors in succession. FIGS. 1 and 2 illustrate related art projectors.

Referring to FIGS. 1 and 2, the related art projector is provided with a lamp 1, a reflection plate 2, a color wheel 4, a rod lens 6, first lenses 7 and 8, a mirror 10, a second lens 12, a prism 16, a display 14, and a projection lens 18.

Beams of lights from the lamp 1 are focused onto the color wheel 4 by the reflection plate 2, and the color wheel 4 transmits the red, green, and blue colors in succession as motor 5 rotates the color wheel. The beams split by the color wheel 4 are incident on the rod lens 6, and the rod lens 6 makes the beams uniform for uniform distribution of the beams on a screen. The beams passed through the rod lens 6 proceeds to the mirror 10 through the first lenses 7 and 8, and reflected at the mirror 10 toward the second lens 12. The second lens 12 focuses the beams from the mirror 10 onto the prism 16, and the prism 16 guides the beams from the second lens 12 to a display 14, and, on the same time, supplies a picture beam from the display 14 toward the projection lens 18. The display 14 produces a picture beam loaded with picture information by using the beams from the prism 16. The prism 16 reflects the picture beam from the display 14 toward the projection lens 18. To do this, as shown in FIGS. 3A and 3B, the prism 16 has a first reflection surface 20 for reflecting the beams from the second lens to the display for the first time, and a second reflection surface 22 for reflecting the picture beam from the display 14 to the projection lens 18 for the second time. Finally, the projection lens 18 enlarges the picture beam, and projects the picture beam to a screen at a distance in front of the projection lens 18. FIGS. 4A and 4B illustrate related are the color wheel in FIG. 1.

Referring to FIGS. 4A, 4B and 5, the related art color wheel 4 is provided with color filters 26 each for transmitting a beam of light with a wavelength of a relevant color among the white beams, a coupler 24 having the color filters 26 fitted thereto, and a motor 5 having the coupler 24 fitted thereto.

The color filter 26 is provided with a red color filter 26R for transmitting red beams among the white beams, a green color filter 26G for transmitting green beams among the white beams, and a blue color filter 26B for transmitting blue beams among the white beams.

The color filter 26 is attached to the coupler 24 by an adhesive, and the coupler 24 is fastened to the motor 5 by holes 25 therein. That is, the color filter 26 splits colors in succession as the motor rotates the color filters 26. It is preferable that the beam passes a boundary 27 of the color filters within the shortest time period when the beam transmits the color wheel 4 shown in FIGS. 4A, 4B and 5. For an example, when it is assumed that the motor rotates at 3600 rpm for displaying 60 fields per a second, a time period required for the beam to pass the boundary will be calculated. In this instance, it is assumed that the beam is rectangular with an 8 mm width, and a 6 mm height, and the color filter 26 has an inside radius of 30 mm, and an outside radius of 40 mm.

Equation (1) expresses an angle when the beam passes a surface of the color filter 26, and the equation (2) expresses a time when the beam passes the boundary 27 of the color filter 26.

$$\theta = 2 \times \arctan\left(\frac{3}{31}\right) = 11.055°, \quad (1)$$

(where, 31 is a distance from a center of the color wheel 4 to the beam, and 3 is a half of the height of the beam).

$$t = \frac{1}{60} \times \frac{11.055}{120} = 1.54 \ \mu s, \quad (2)$$

(Where, 120 is a value obtained by dividing 360° by 3, a number of boundaries 27).

From equation (2), it can be known that the time period required for the beam to pass through the boundary 27 of the color filter 26 is 1.54 μs. As can be known from equations (1) and (2), for reducing the time period required for the beam to pass through the boundary 7 of the color filter 26, it is necessary to make the inside radius of the color wheel 4 greater. However, the greater the inside diameter of the color wheel 4, the larger and the heavier the projector become.

Moreover, the related art color wheel 4 can not be fitted overlapped with other optical system (various lenses), to require much space. Furthermore, the related art prism 16 makes two times of total reflection for transmission of the beams from the second lens 12 to the projection lens 18, with a loss of luminance.

SUMMARY OF THE INVENTION

Accordingly, the present invention is directed to a total reflection prism and a projector with the same that substantially obviates one or more of the problems due to limitations and disadvantages of the related art.

An object of the present invention is to provide a total reflection prism and a projector with the same, which permits to fabricate a thinner projector, and enhance a luminance.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the total reflection mirror makes one time of total reflection of the beams of lights from an optical system to a projection lens.

In another aspect of the present invention, there is provided a projector with a total reflection prism including a light source for emitting beams of lights, a color wheel for receiving the beams from the light source, splitting color beams from the beams in succession, and transmitting the color beams, a transmission part for guiding the color beams to the prism, a display for producing a picture beam according to a video signal by using the color beams from the transmission part, a prism arranged between the transmission part and the display for guiding the color beams from the transmission part to the display, and reflecting the picture beam from the display, and a projection lens for enlarging, and projecting the picture beam.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 6:
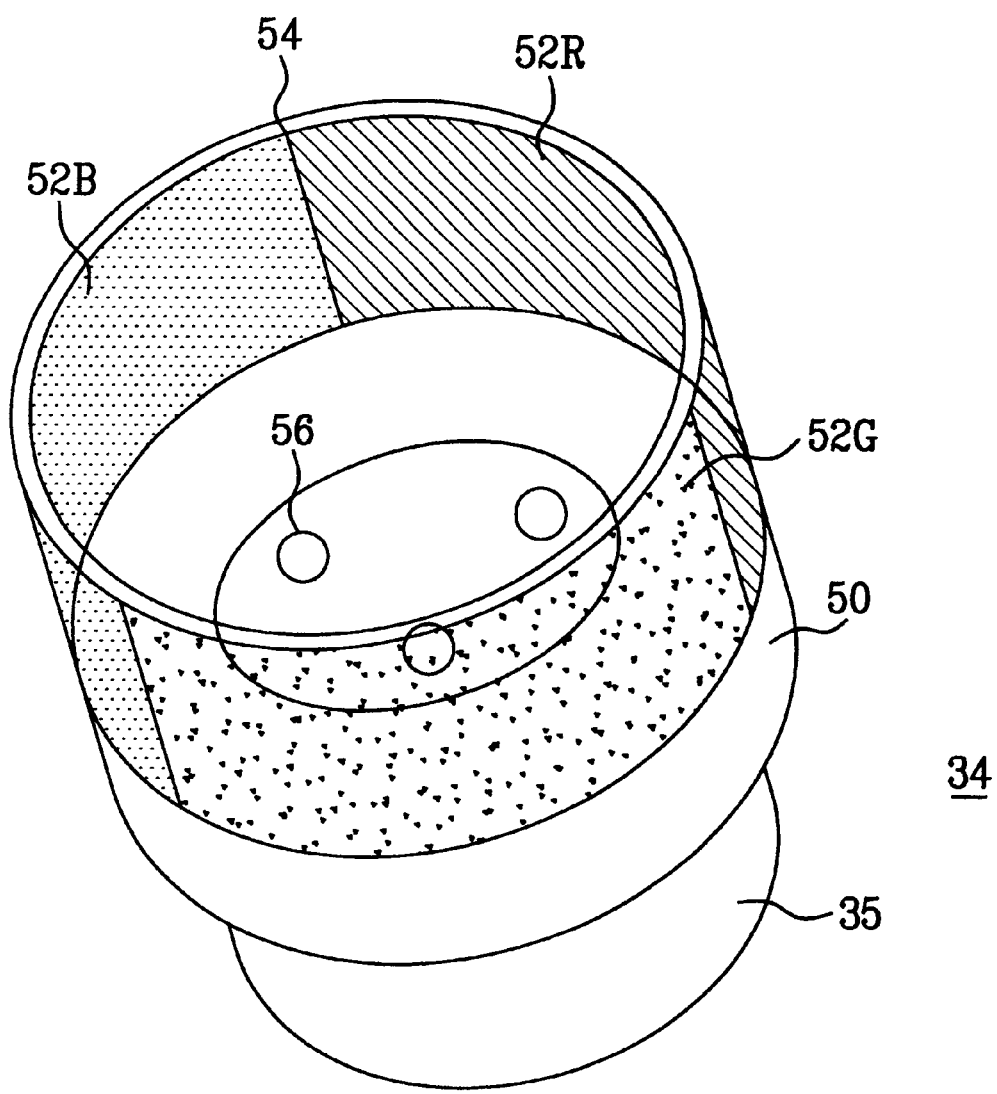
FIG. 6 illustrates a perspective view of a cylindrical color wheel in accordance with a preferred embodiment of the present invention.

Reference will now be made in detail to the preferred embodiments of the present invention, examples of which are illustrated in the accompanying drawings 6–13. FIG. 6 illustrates a perspective view of a cylindrical color wheel in accordance with a preferred embodiment of the present invention.

Referring to FIG. 6, the cylindrical color wheel 34 in accordance with a preferred embodiment of the present invention includes color filters 52 each for transmission of a relevant color among white beams, a coupler 50 having the color filters 52 fitted thereto, and a motor 35 coupled with the coupler 50.

The color filters 52 include a red color filter 52R for transmission of red beams among the white beams, a green color filter 52G for transmission of green beams among the white beams, and a blue color filter 52B for transmission of blue beams among the white beams.

The color filters 52 are inserted in the coupler 50 and attached thereto with adhesive, and the coupler 50 is coupled with the motor 35 by means of the holes 56 therein. That is, the color filters 52 split colors in succession as the color filters 52 are rotated by the motor 35.

Figure 7A:
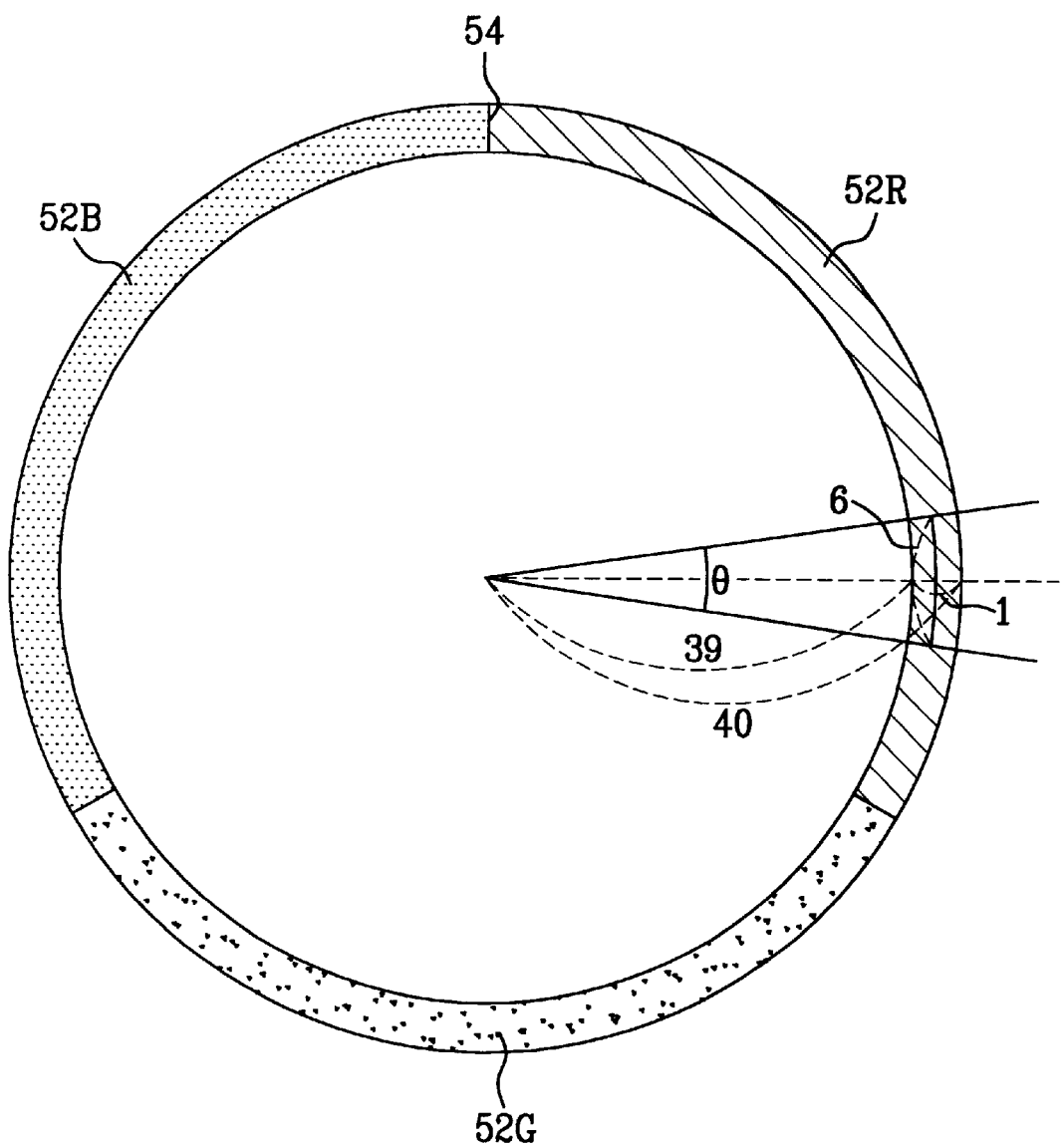
FIGS. 7A and 7B illustrate a time required for a beam to pass through a boundary of a cylindrical color wheel in FIG. 6.
Figure 7B:
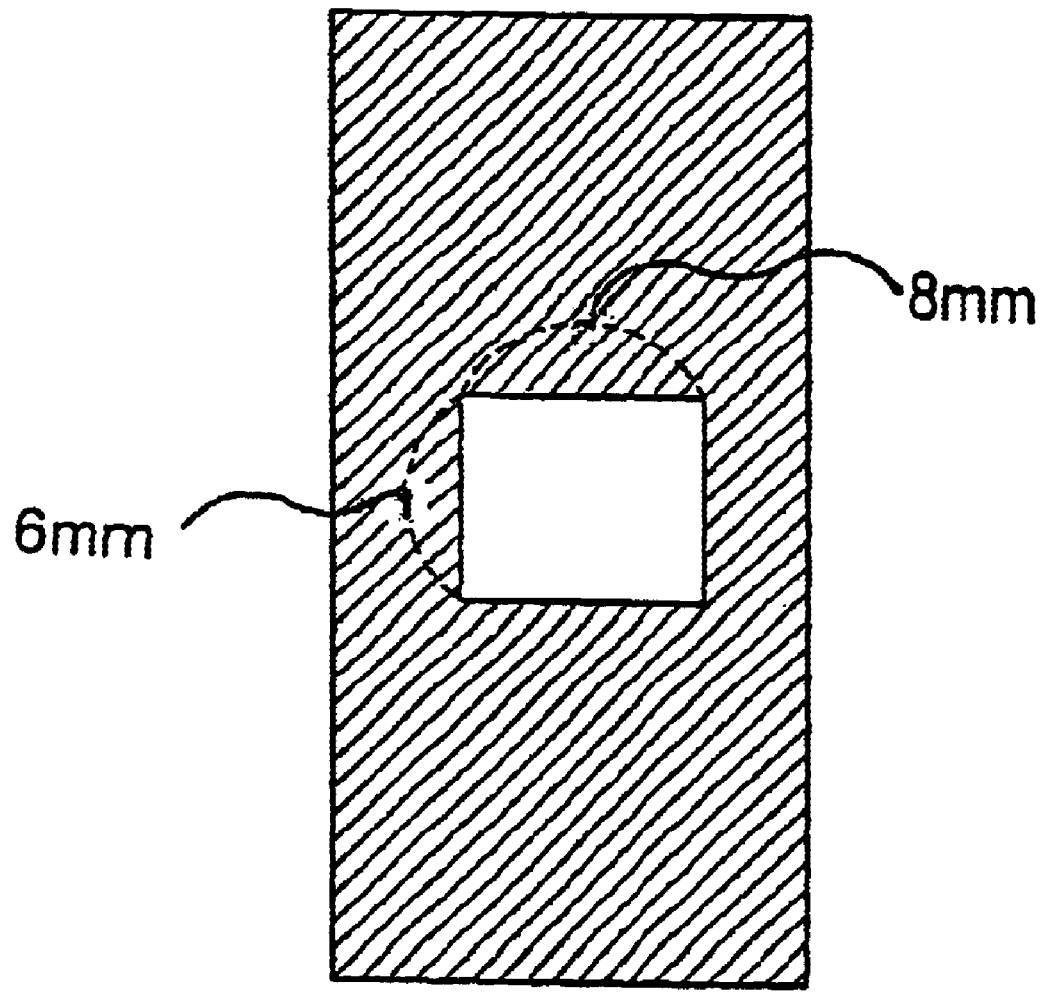

When it is assumed that the motor rotates at 3600 rpm to display 60 fields per a second, a time period required for the beam to pass a boundary 54 of the cylindrical color wheel 34 will be calculated. In this instance, as shown in FIGS. 7A and 7B, it is assumed that the beam is rectangular with an 8 mm width, and a 6 mm height, and the cylindrical color wheel 34 has an inside radius of 39 mm, and an one mm thickness.

Equation (3) expresses an angle when the beam passes a surface of the color filter 52, and the equation (4) expresses a time when the beam passes the boundary 54 of the color filter 52.

$$\theta = 2 \times \arctan\left(\frac{3}{39}\right) = 8.797°, \quad (1)$$

(where, 39 is the inside radius of the color wheel 34, and 3 is a half of the height of the beam).

$$t = \frac{1}{60} \times \frac{8.797}{120} = 1.22 \ \mu s, \quad (2)$$

(where, 120 is a value obtained by dividing 360° by 3, a number of boundaries 54).

From equation (4), it can be known that the time period required for the beam to pass through the boundary 54 of the color filter 52 is 1.22 $\mu s$, while the time period required for the beam to pass through the boundary of the color filter in the related art color wheel is 1.54 $\mu s$. Therefore, the present invention can enhance the luminance of the projector, as the time period required for the beam to pass through the color filter 52 of the present invention is longer. Also, the radius of the color wheel 34 of the present invention can be reduced to 32 mm on the same luminance basis of the color wheels of the present invention and the related art, i.e., the projector with the color wheel 34 of the present invention can be fabricated thinner than the related art.

Figure 8:
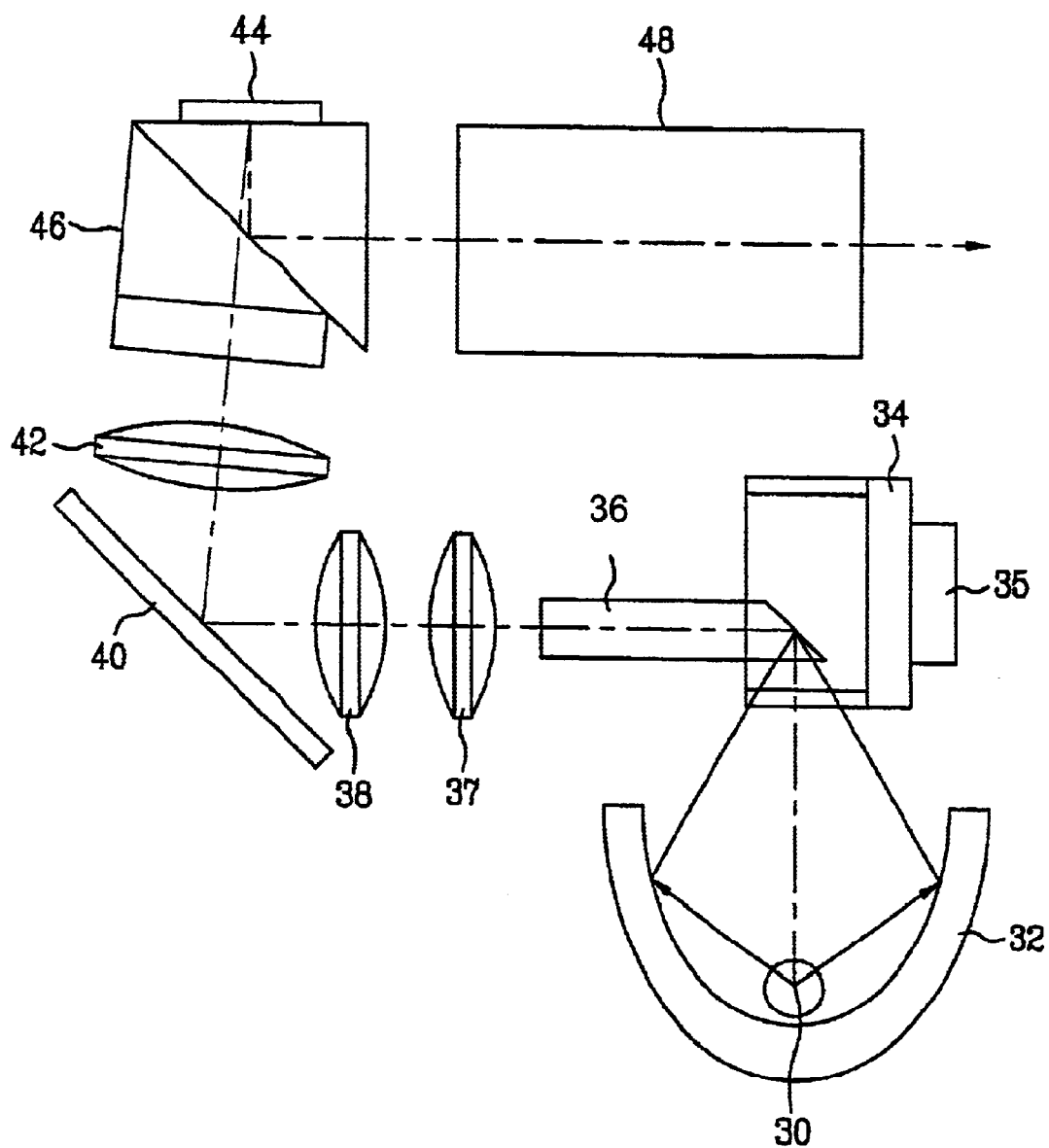
FIGS. 8 and 9 illustrate projectors in accordance with a first preferred embodiment of the present invention.
Figure 9:
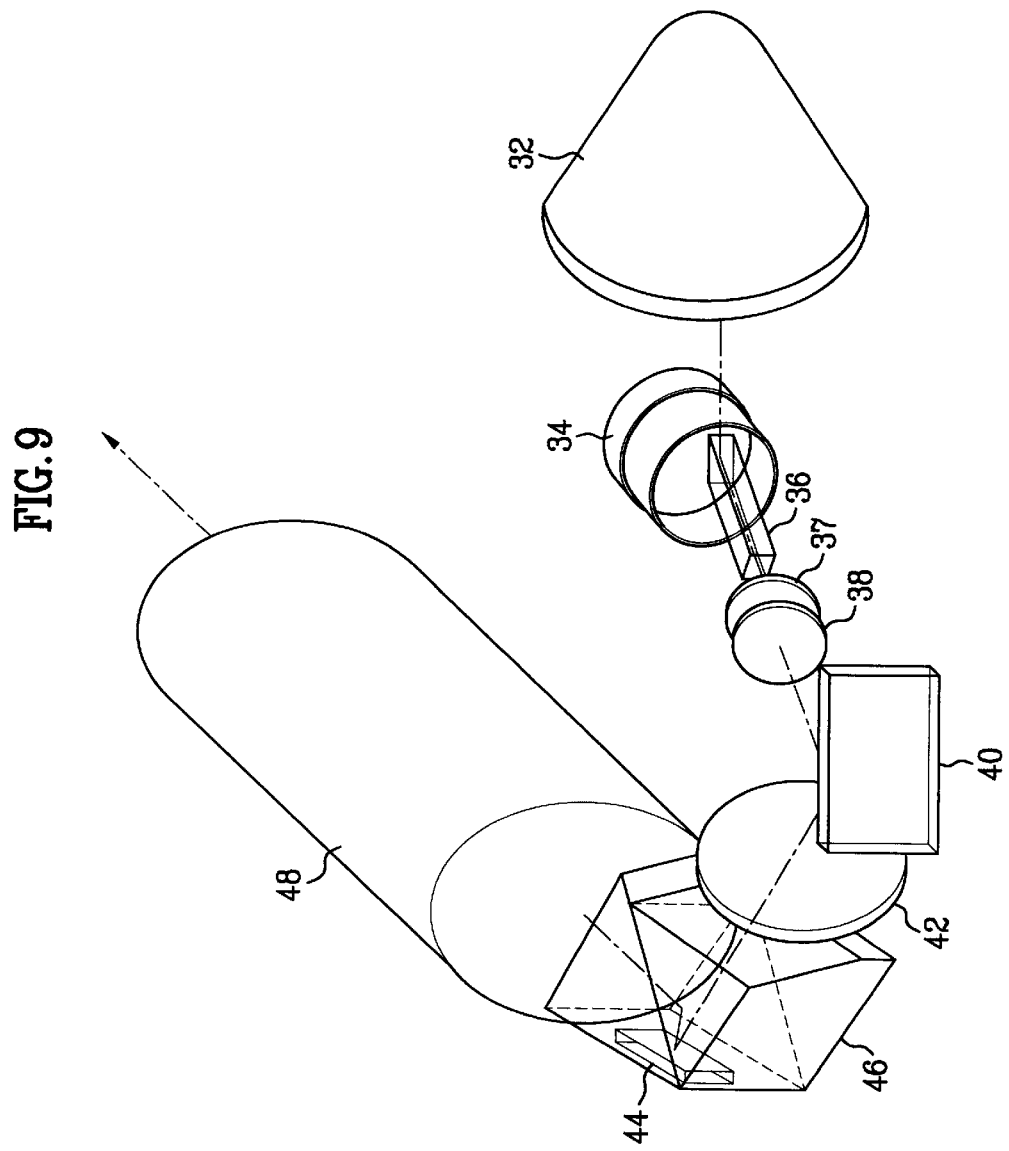

FIGS. 8 and 9 illustrate projectors in accordance with a preferred embodiment of the present invention.

Referring to FIGS. 8 and 9, the projector in accordance with a preferred embodiment of the present invention includes a lamp 30, a reflection plate 32, a cylindrical color wheel 34, a rod lens 36, first lenses 37 and 38, a mirror 40, a second lens 42, a prism 46, a display 44, and an enlarging and projecting lens 48.

The beams from the lamp 30 are focused on the cylindrical color wheel 34 by the reflection plate 32, and the cylindrical color wheel 34 transmits red, green, and blue beams in succession, as the motor 35 rotates the cylindrical color wheel 34. The beams color split by the cylindrical color wheel 34 are incident on the rod lens 36, and the rod lens 36 makes distribution of the beams uniform for uniform distribution of the beams on the screen, and deflects a path of the beams.

Figure 10:
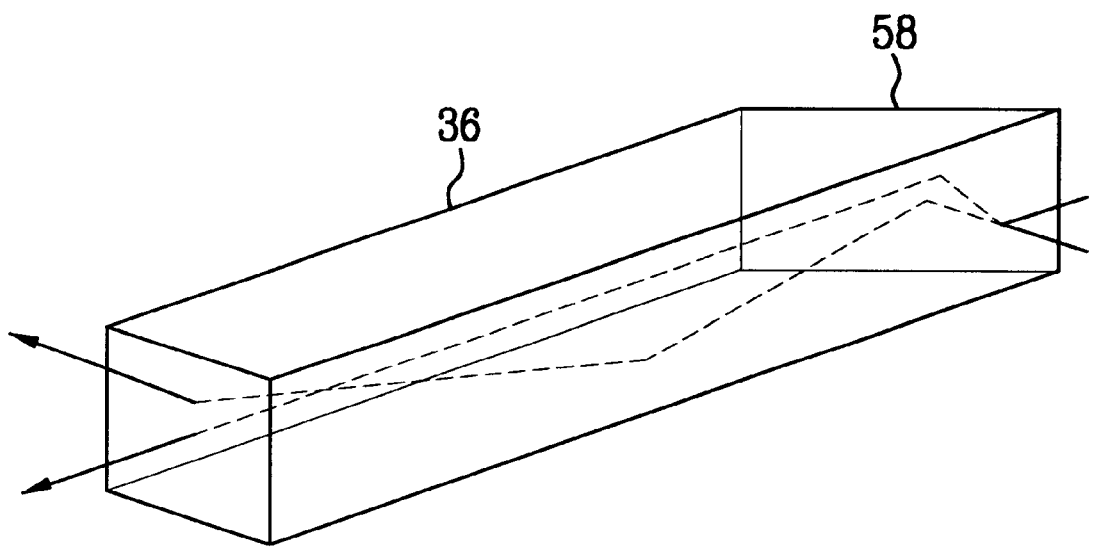
FIG. 10 illustrates a detail of the rod lens in FIG. 8.

To do this, referring to FIG. 10, the rod lens 36 has an incident surface 58 sloped at an angle with respect to the beam from the reflection plate 32. Also, the incident surface 58 is a total reflection mirror, or has a coat of total reflection material applied thereto.

Figure 12:
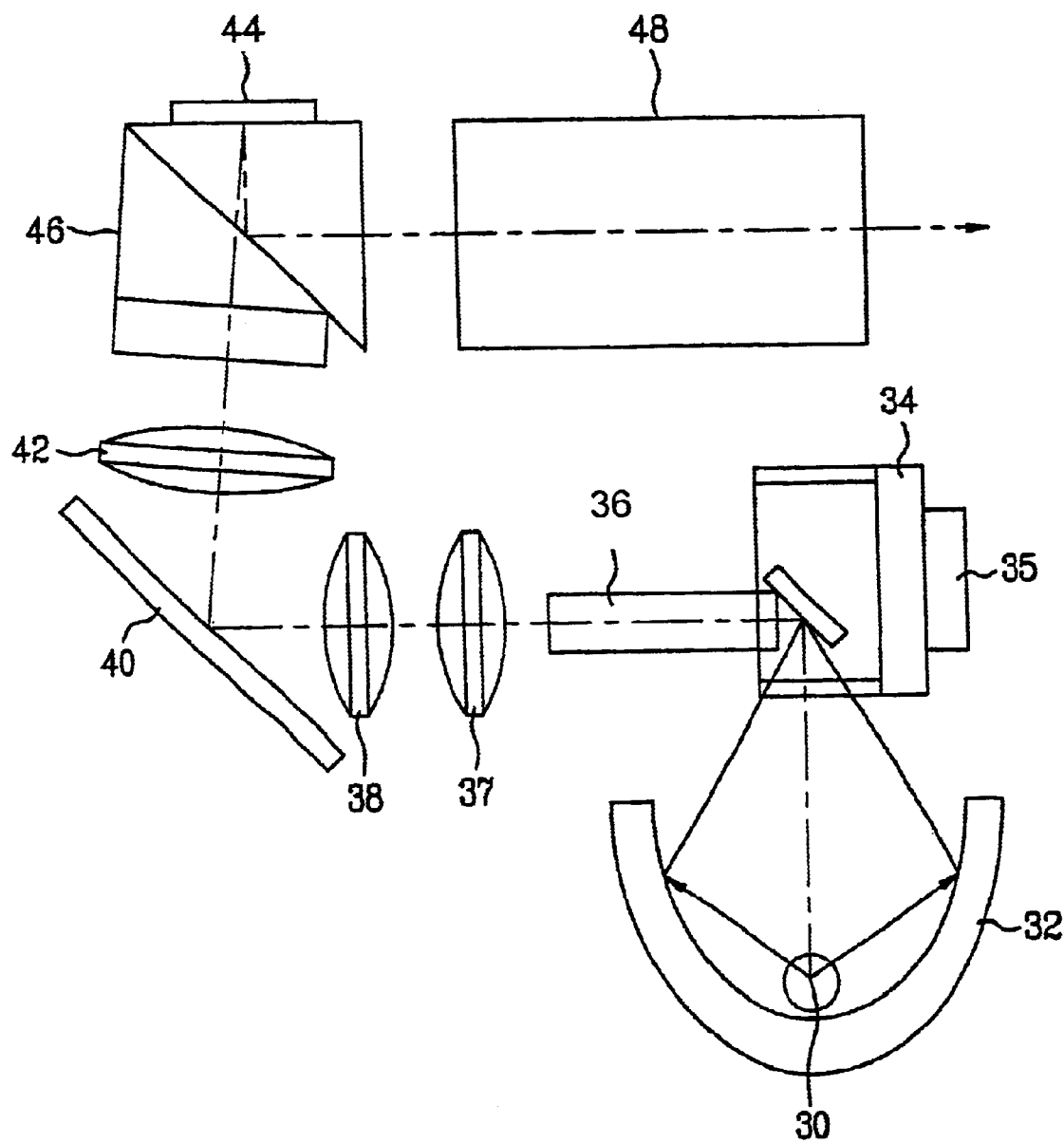
FIG. 12 illustrates a projector in accordance with a second preferred embodiment of the present invention; and, FIG. 13 illustrates a projector in accordance with a third preferred embodiment of the present invention.

As an alternative to this, referring to FIG. 12, a rod lens the same with the rod lens 6 in the related art may be used, when a mirror 39 is required in front of the incident surface of the rod lens 6 for deflecting the path of the beams, additionally.

The beams reflected at the rod lens 36 proceeds to the mirror 40 by the first lenses 37 and 38, and reflected at the mirror 40 to the second lens 42. The second lens 42 receives the beams from the mirror 40, and focuses onto the prism 46, and the prism 46 guides the beams from the second lens 42, and supplies a picture beam from the display 44 to the projection lens 48.

A prism of the present invention will be explained in detail with reference to FIGS. 11A and 11B.

Figure 11A:
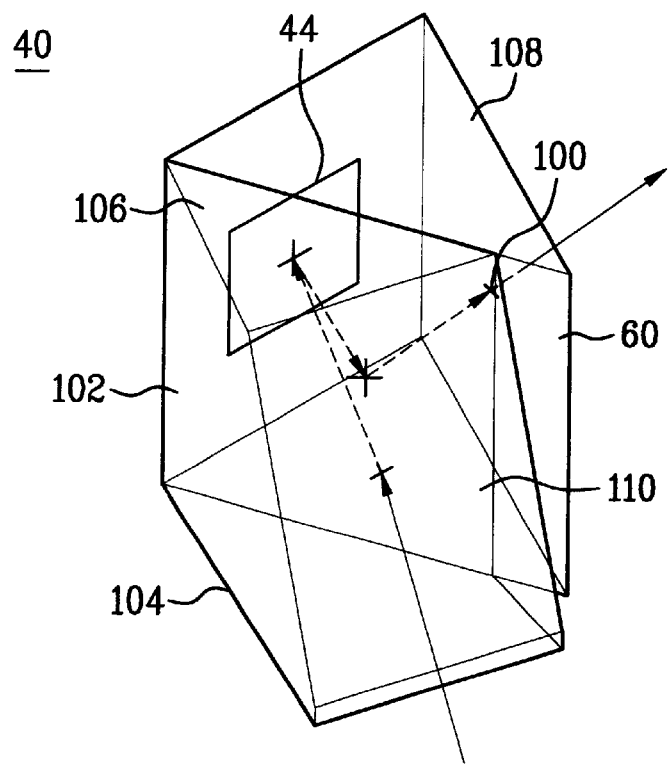
FIGS. 11A and 11B illustrate details of the prism in FIG. 8.
Figure 11B:
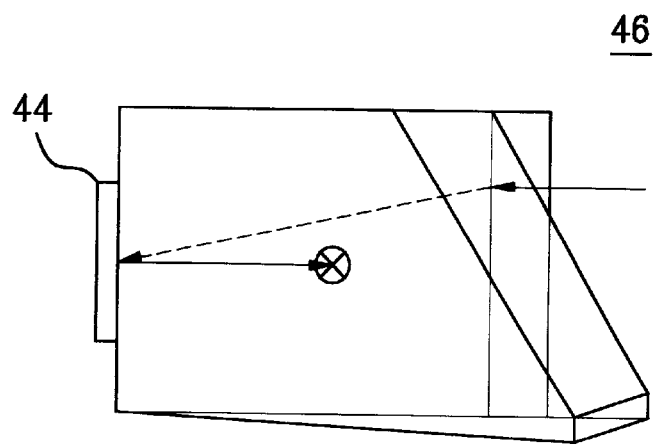

Referring to FIGS. 11A and 11B, the prism 46 of the present invention includes a first sub-prism 100 having a top surface 108 and a bottom surface 110, both in triangular forms, and a second sub-prism 102 having a top surface 106 in a form of triangle, and a bottom surface 104 in a form of a parallelogram.

There is a display 44 on a side surface of the first sub-prism 100. The first prism and the second prism are disposed with a minute air gap between them. A contact surface 60 of the first sub-prism 100 and the second sub-prism 102 refracts the beams from the second lens 42 to the display 44, and reflects the picture beam from the display 44 to the projection lens 48, thereby deflecting the path of the beams from the second lens 42 to a preset angle.

Figure 1:
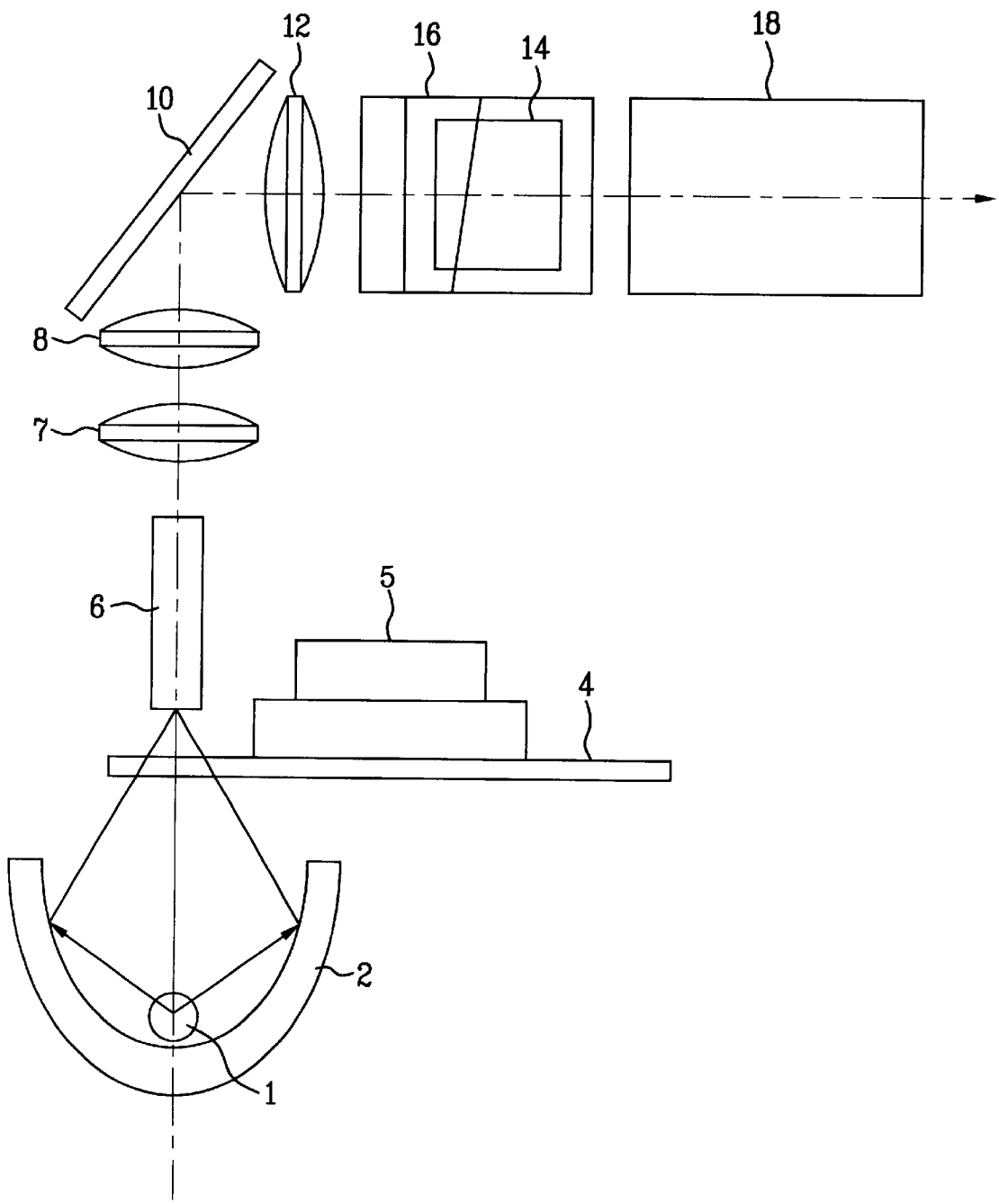
FIGS. 1 and 2 illustrate related art projectors.
Figure 2:
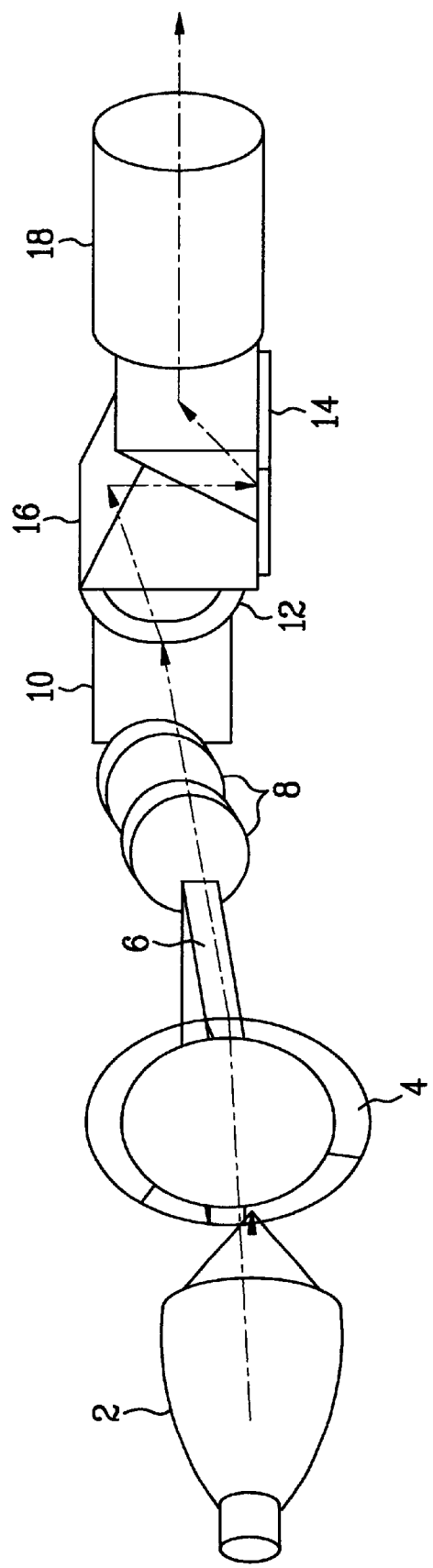
Figure 3A:
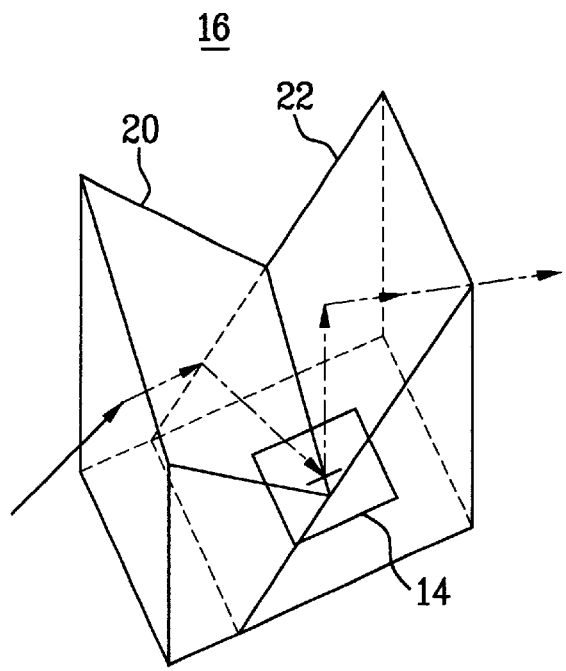
FIGS. 3A and 3B illustrate details of the related art total reflection prism in FIG. 1.
Figure 3B:
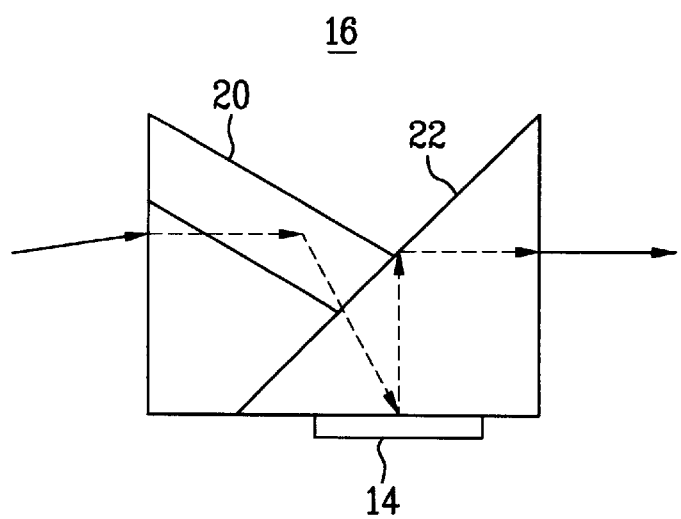
Figure 4A:
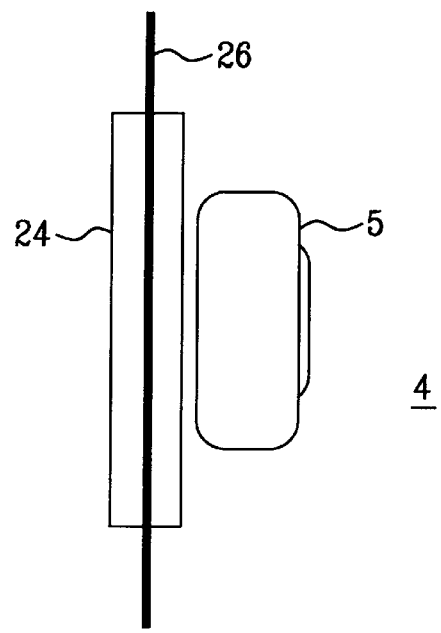
FIGS. 4A and 4B illustrate details of the related art color wheel in FIG. 1.
Figure 4B:
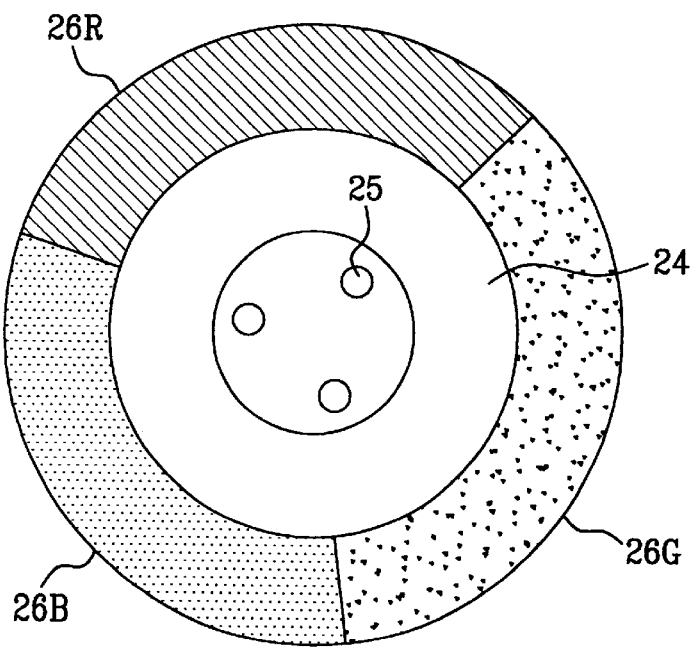
Figure 5:
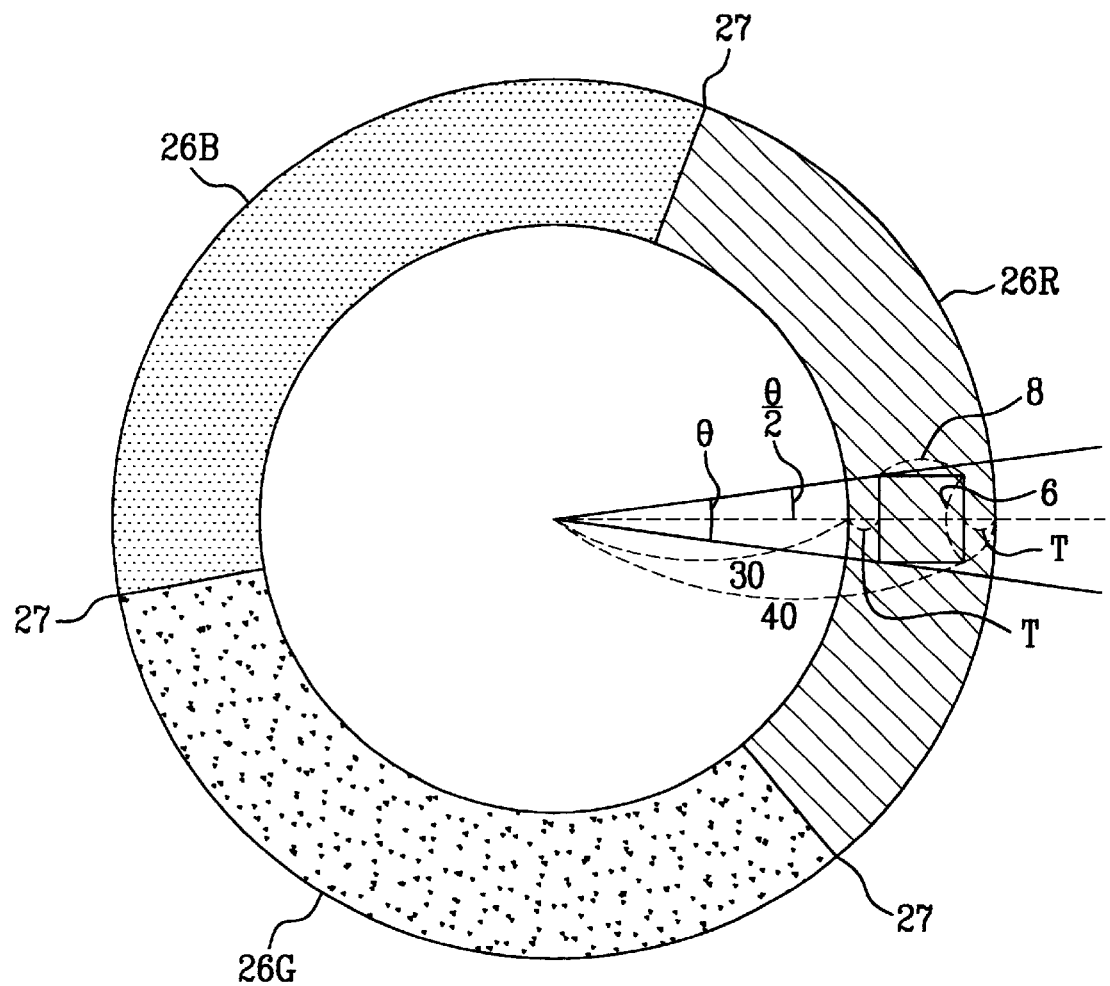
FIG. 5 illustrates a time required for the beam to pass through a boundary of the color wheel in FIG. 1.

The prism 46 of the present invention is compared to the related art prism 16 in FIGS. 3A or 3B, to find that, though the related art prism 16 totally reflects the beams from the second lens 12 for two times for directing the beams toward the projection lens 18, the prism 46 of the present invention totally reflects the beams only once for directing the beams from the second lens 42 toward the projection lens 48, thereby minimizing a loss of luminance caused by the total reflection. Moreover, though the related art prism 16 is required to be arranged three dimensionally owing to a complicated optical path from the lamp to the projection lens, the prism 46 of the present invention is arranged two dimensionally in parallel with the projection lens 48, the prism 44, the cylindrical color wheel 34, the rod lens 36, the first lenses 37 and 38, and the mirror 40, to allow fabrication of a thinner projector.

Furthermore, though the related art projector is difficult to fabricate a thinner projector owing to a high optical system caused by the display 14 arranged under the prism 16, the projector of the present invention permits to fabricate a thinner projector because the display 44 is arranged at a side of the prism 46.

The projection lens 48 receives the picture beam from the prism 46, and enlarges, and projects to a screen in front of the projection lens 48 at a distance.

Figure 13:
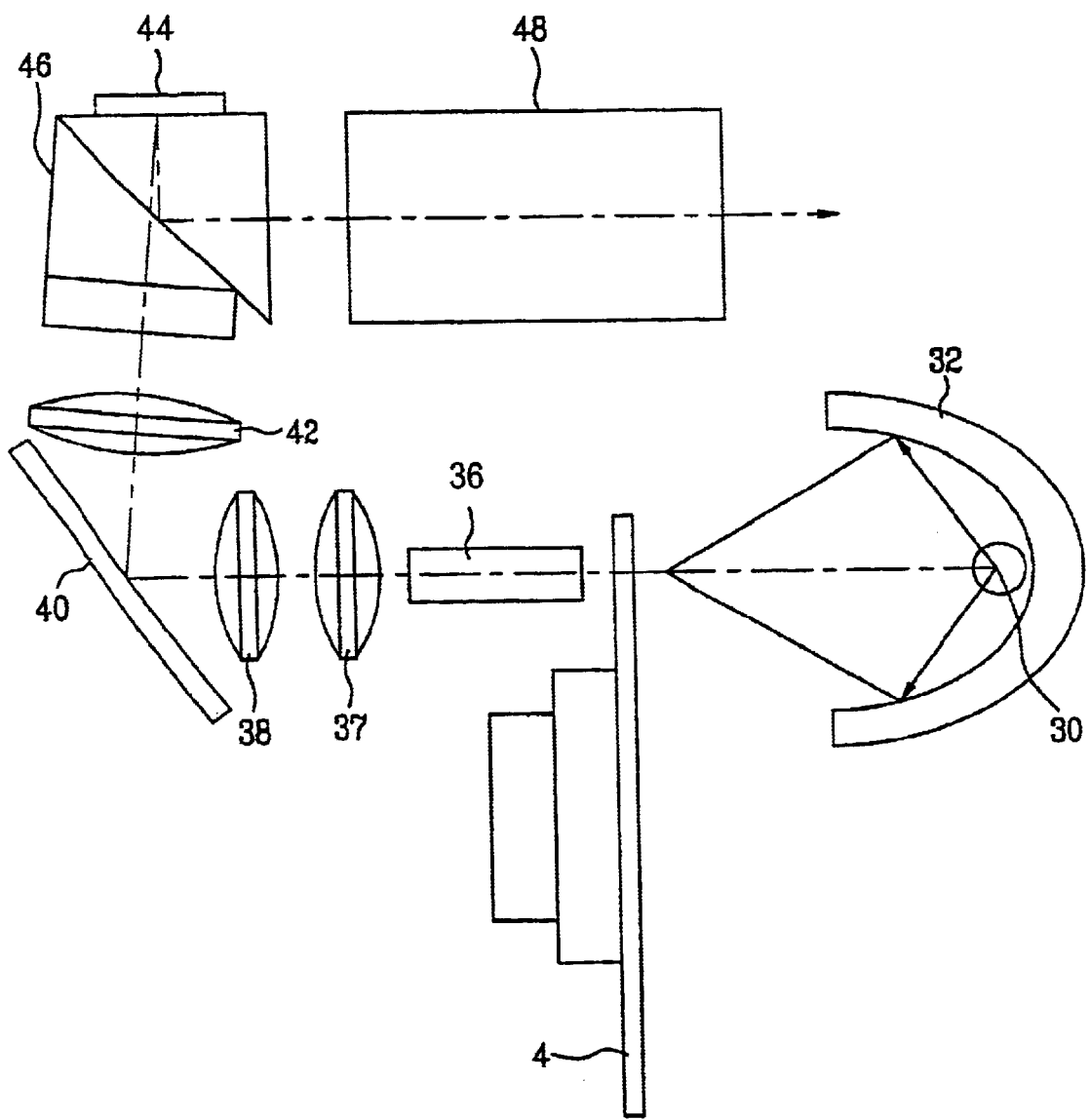

In the meantime, the present invention may employ the color wheel 4 and the rod lens 6 identical to the related art in FIG. 13.

As has been explained, according to the total reflection prism and the projector with the same of the present invention, the prism makes total reflection only once for directing the beams from an optical system to the projection lens, that minimizes a loss of luminance caused by the total reflection.

Moreover, the arrangement of the display and the prism side by side, both parallel with the color wheel, the optical system, the prism, and the projection lens permits to fabricate a thinner projector.

It will be apparent to those skilled in the art that various modifications and variations can be made in the total reflection prism and the projector with the same of the present invention without departing from the spirit or scope of the invention. Thus, it is intended that the present invention cover the modifications and variations of this invention provided they come within the scope of the appended claims and their equivalents.

What is claimed is:

1. A projector with a total reflection prism comprising:

a light source for emitting beams of lights;

a color wheel for receiving the beams from the light source, splitting color beams from the beams in succession, and transmitting the color beams wherein the color wheel comprises a color drum having a plurality of color filters integrated thereto each for transmission of beams of different color wavelengths;

a transmission part for receiving the color beams transmitted by the color wheel and guiding the color beams to the prism wherein the transmission part includes:
   a rod lens for making distribution of the color beams uniform,
   at least one first lens for focusing the color beams from the rod lens onto a mirror,
   a mirror for deflecting a path of the color beams from the lens, and
   at least one second lens for focusing the color beams from the mirror onto the prism;

a display for producing a picture beam according to a video signal by using the color beams from the transmission part;

a prism arranged between the transmission part and the display for guiding the color beams from the transmission part to the display, and reflecting the picture beam from the display; and a projection lens for enlarging, and projecting the picture beam.

2. A projector as claimed in claim 1, wherein the rod lens has an incident surface arranged to overlap with the color wheel, and sloped for deflecting a path of the color beams.

3. A projector as claimed in claim 1, wherein the incident surface of the rod lens has a coat of a total reflection material applied thereto, or a total reflection mirror fitted thereto.

4. A projector as claimed in claim 1, wherein there is a mirror in front of the incident surface of the rod lens for transmission of the color beams to the rod lens.

5. A projector as claimed in claim 1, wherein the color wheel is arranged on a line the same with the transmission part, different from a line of the prism and the projection lens.

6. A projector comprising:

a light source for emitting light;

a color wheel for receiving the light from the light source, and sequentially transmitting color components of the light;

a display for producing a picture beam according to a video signal by using the color components;

a prism positioned to guide the color components to the display and for reflecting the picture beam from the display, wherein the prism is adapted so that the color components are guided to the display without undergoing reflection;

a transmission part positioned between the color wheel and the prism for receiving the color components transmitted by the color wheel and guiding the color components to the prism; and a projection lens for enlarging and projecting the picture beam.

* * * * *